United States Patent [19]
Robinson

[11] Patent Number: 5,398,985
[45] Date of Patent: Mar. 21, 1995

[54] TRUCK-BED COVER WITH PASSENGER COMPARTMENT

[76] Inventor: Bruce Robinson, 6520 Paseo Caballo, Anaheim Hills, Calif. 92807

[21] Appl. No.: 303,371

[22] Filed: Sep. 9, 1994

[51] Int. Cl.⁶ ............................ B60P 3/42; B60N 2/00
[52] U.S. Cl. .................................... 296/10; 296/64; 296/85; 296/100; 296/180.1
[58] Field of Search .................. 296/63, 64, 66, 10, 296/37.6, 85, 100, 136, 180.1

[56] References Cited

U.S. PATENT DOCUMENTS

| | | | |
|---|---|---|---|
| 1,416,816 | 5/1922 | Gravel | 296/66 |
| 1,587,006 | 6/1926 | Ledwinka | 296/66 |
| 2,880,033 | 3/1959 | Shelton | 296/66 |
| 3,317,237 | 5/1967 | Kerby | 296/63 |
| 3,323,828 | 6/1967 | Esche | 296/63 |
| 3,829,151 | 8/1974 | Fellenstein | 296/64 |
| 4,083,596 | 4/1978 | Robinson | 296/100 |
| 4,623,187 | 11/1986 | Ibrahim | 296/39.2 |
| 4,750,778 | 6/1988 | Hoban | 296/66 |
| 4,911,493 | 3/1990 | Muirhead | 296/39.2 |
| 5,139,301 | 8/1992 | Lewis | 296/63 |

FOREIGN PATENT DOCUMENTS 137361 1/1920 United Kingdom ................ 296/63

*Primary Examiner*—Dennis H. Pedder
*Attorney, Agent, or Firm*—Gene Scott

[57] ABSTRACT

A rigidly constructed tonneau cover, hatch and seat assembly is disclosed for converting the truck bed of a standard pickup truck into an expanded seating capacity outside of the truck cab. The assembly is comprised of a generally rectangular tonneau cover for covering the bed portion of the pickup truck. This cover includes a hingably openable back portion that functions like a trunk to allow easy access to the truck bed. This portion can be locked so the contents of the truck bed are secured. The tonneau cover also has a removable hatch that provides access and protection for a rotatably mounted windshield, and for persons in one or more seats slidably mounted on the truck bed. In the closed position, the hatch protects the truck bed, seats, and added cargo, etc., from damage and undesired access. When the hatch is detached from the tonneau cover, it may be positioned vertically behind the seats and projects above the surface of the tonneau cover. A windshield positioned in front of the passengers, in conjunction with the hatch, produces a region of reduced air movement within the passenger seating area. Consequently, drafts, wind and occasional debris that accompany the moving air are deflected away from the passengers. This provides added comfort and safety for the passengers, and lowers wind resistance along the bed of the truck.

8 Claims, 4 Drawing Sheets

TRUCK-BED COVER WITH PASSENGER COMPARTMENT

FIELD OF THE INVENTION

This invention relates generally to truck bed covers and more particularly to a new and improved tonneau cover with a rotatably mounted windshield, removable hatch and seat assembly designed to convert the bed of a truck into an expanded seating space, with reduced wind resistance in the rear cockpit area and relatively unobstructed rear-viewing from the cab.

BACKGROUND OF THE INVENTION

Invention and use in the subject area is known to the public as a variety of patented cover and seat accessory devices are disclosed in the prior art. Some of these devices allow for the inexpensive conversion of a pickup truck from loading and hauling purposes to expanded seating capacity, and thus transform the pickup truck from a utility truck to a passenger and recreation vehicle.

This concept of increased vehicle seating capacity likely originated with the conception of the rumble seat. These seats, placed in the trunks of two-passenger automobiles, enjoyed immense popularity during the 1920's and 1930's. As in U.S. Pat. No. 2,880,033 to Alvin Lanier Shelton, these seats greatly reduced the driver's rear visibility, if not completely obstructing it, and rendered the storage capacity of the vehicle trunk useless. However, in U.S. Pat. No. 3,323,828 to Delbert E. Esche, the design of the rumble seat was altered so as to not significantly decrease the trunk's carrying capacity.

In 1974 Ronald Fellenstein adapted the premise of the rumble seat to be functional in the bed of a pick-up in U.S. Pat. No. 3,829,151. This invention consists of a tonneau cover and rumble seat-type assembly, wherein a tonneau cover is provided with an access opening and a convertible seat and closure are operatively associated with the tonneau cover. In one position the seat holds passengers in the box and the seat is movable to another position to close off the access opening. Unfortunately, this invention also brought along with it many of the same problems of the original rumble seats, namely reduced or completely obstructed driver visibility and limited storage space.

In 1988 in U.S. Pat. No. 4,750,778, inventor Edward Hoban introduced a convertible hard top/jump seat in which a pickup can be modified so that the roof section of the cab can be hingably detached from the front windshield and moved into a position behind the rear cab wall. When the roof is moved into this position it serves as a rearwardly facing jump seat. The truck bed would also be modified to offer a mechanism to secure the jump seat in place. While of very unique design, this invention seems to be rather impractical for actual application. Obtaining all the features necessary for proper functioning, such as the hingably moveable cab roof, would require extensive modification to the existing vehicle, a procedure that would prove to be quite costly. The other option would be to manufacture a pick-up with these features included, another costly undertaking.

Hence, in 1986, with U.S. Pat. No. 4,623,187, Aftab Ibrahim took a new direction in increasing the passenger capacity of a pickup truck. His truck insert is of a size to substantially fill and essentially eliminate horizontal movement in the truck bed and includes securing members for attaching to the truck to secure against vertical movement. The insert further includes forward and rearward sitting regions each having a seat for readily converting the truck bed to a seating area. While this does achieve the goal of adding additional seating capacity to a pickup, in doing so it eliminates the storage abilities of the truck bed as the insert covers the entire surface area and the back tail gate access. Additionally, this type of full-coverage insert results in an attachment that is both heavy and difficult to remove, making it even more difficult to conveniently utilize the storage potential of the bed.

In 1990 Scott Muirhead improved upon this design with a seat liner insert in U.S. Pat. No. 4,911,493. This invention is also an insert that covers the entire truck bed, but it is constructed so that the portion nearest the cab of the truck is formed into a rearwardly facing bench seat, extending just beyond and fully covering the wheel wells. The remaining part of the cover lies flat along the pick-up bed, allowing for some storage space. In addition, the seat back of the rear facing seat is hinged at the top and locked at the bottom to provide an additional, secure storage compartment. While this design does increase the storage capacity of the insert, it still has the inherent disadvantage present in Ibrahim's invention, which is that a full bed insert tends to be heavy and difficult to remove.

Finally, in 1992 William Lewis presented a portable truck bed seat with U.S. Pat. No. 5,139,301 that rid the need for a full-bed insert. His invention consists of any number of seating units to be secured in the bed of a truck. Each seat includes short legs and body-supporting cushions attached to an associated frame structure. Adjustable clamps are movably attached to the frame structures and these clamps are attached to the edges or lips of the truck beds to effectively lock the seats in position during use. While this does provide an easier method for removing the seats and a greater ability to utilize the truck bed's storage capacity, it still has a number of inherent problems, present in all prior art, that are remedied in the present invention.

First of all, none of the prior art includes a cover member that shelters the truck bed and its contents from the elements, nor do they include a locking mechanism so as to further secure said contents. Additionally, none of the prior art devices employ a tonneau cover hatch and seat assembly whose individual components are sufficiently light enough to allow rapid installation and removal by one person. Moreover, none of the prior art devices are sufficiently versatile so that the truck bed can function both as a cargo compartment together with an expanded seating capacity without requiring removal or extensive alterations of the modifying components.

Also, the prior art devices do not reduce the wind resistance along the rear of the truck, but instead, many deflect air and occasional debris into the passengers area. The present invention includes features, such as a hingably mounted windshield, and is constructed in such a way as to shield the passengers from the uncomfortable wind resistance. Finally, none of the prior art make provisions to keep obstruction of the driver's rear-view visibility to a minimum, while the new invention is designed so as to keep the passenger seating low to the truck bed to keep maximum visibility.

Preferably, a truck conversion should increase the seating capacity of the truck bed in an aesthetically pleasing way that avoids obstructing the rear view of the driver, while being safe and comfortable for the passengers. The present invention fulfills these needs and provides further related advantages.

SUMMARY OF THE INVENTION

According to the invention, a removable tonneau cover, hatch and seat assembly are provided for converting a truck bed from loading and hauling purposes to an expanded seating capacity, while maintaining a driver's rear vision and enabling the truck bed to be easily converted to its original form.

The tonneau cover, hatch and seat assembly comprises a multi-part, modular attachment for the bed of a pickup truck, one component being a removable tonneau cover having a removable hatch or access opening. An attachment of variable length may be connected to the cover so that truck beds of variable lengths can be accommodated. The tonneau cover is typically constructed of a single, reinforced plastic or fiberglass section which covers the entire outer edge of the truck bed. The cover also has a hingably moveable rear portion that can be locked closed for securing articles in the truck bed and opened upwardly so as to allow convenient access to the trunk bed. The cover can also be designed compatibly to the design of the truck, thus making for a more attractive attachment.

One or more seats are locked into place and secured to the truck bed between the wheel wells. This may be accomplished either by bolts or by means of tracks, in which case the seats may be slidably removed or repositioned to accommodate added cargo when the truck bed is used for leading and hauling purposes. The seats will also include seat belts and shoulder harnesses, and the seat cushions should not exceed more than three inches from the bed, so rear visibility is not blocked.

When the removable hatch is attached to the tonneau cover in the horizontal position, it provides a weather tight gasket seal that protects the truck bed, seats, added cargo, etc. from damage due to rain, moisture, accumulated debris, and undesired access. When the hatch is detached from the tonneau cover, it provides easy access to and from the seating units. When detached from the cover, the hatch is usually placed in a vertical position and locked into the back of the seats where it projects above the tonneau cover surface.

A rotatably mounted windshield is mounted to the front of the cockpit area, attached to the tonneau cover with hinges so that in the closed position, it rests along the underside of the cover in the hatch opening and when opened sits in an upright position in front of the seats so as to protect the passengers from wind and debris.

In their upright positions, use of the hatch in conjunction with the windshield produces a region of reduced air movement inside the passenger area. This reduces drafts, wind and occasional debris that may be deflected against the passengers, while providing added comfort and safety for the passengers and lower wind resistance along the bed of the truck.

Thus, it is an object of the present invention to provide a safe means for increasing the passenger carrying capacity of a pick-up truck. It is a further object of the invention to provide these passengers with a comfortable ride by providing a rear cockpit area that reduces the wind resistance and debris that are typically associated with traveling in the back area of a pick-up truck. It is another object of the present invention to provide unobstructed rear view visibility for the driver when passengers are present.

It is an object of the present invention to provide an apparatus that can be versatile enough so as to easily accommodate passengers when necessary and protect the contents of the truck bed when passengers are not present. This is accomplished by means of a lightweight tonneau cover with a removable hatch portion. It is the object of this invention to provide a cover that is at once lightweight and easy to handle and install, and durable and protective from the effects of the elements. It is a further object of the present invention to provide increased access to the truck bed without necessitating the removal of the cover. This object is accomplished by means of a hingably moveable and lockable back section of the cover. It is also an object of the invention to fit on both long and short bed pickups by means of an alternate, e.g., longer, or shorter rear trunk lid.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
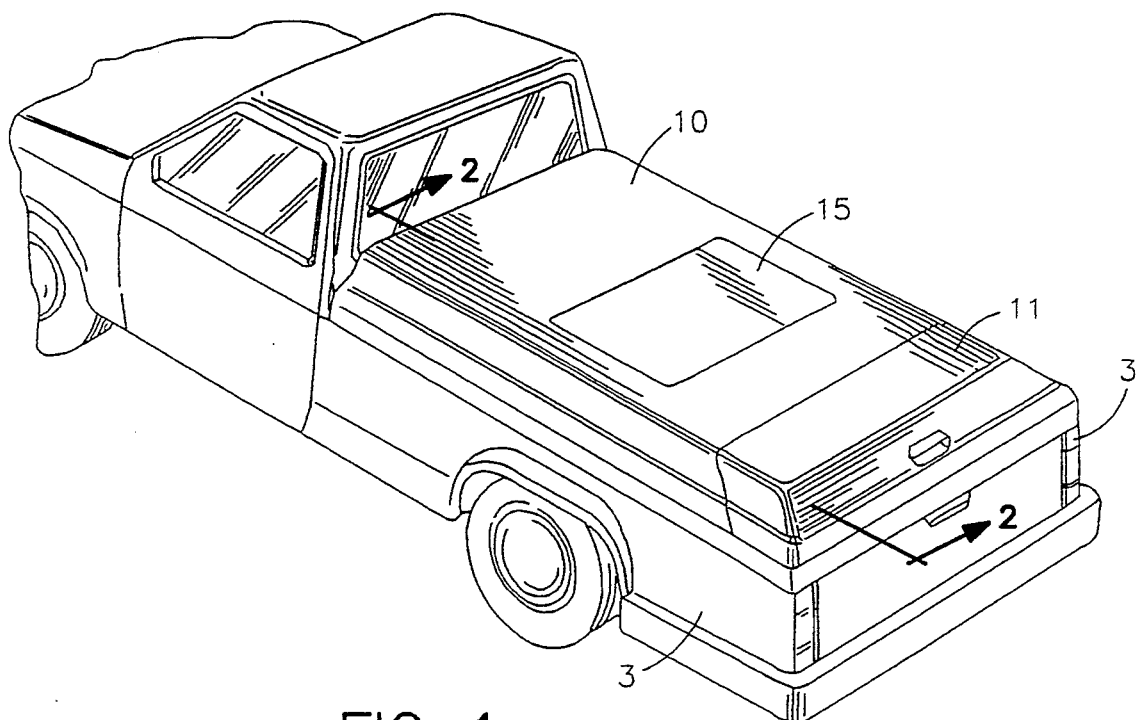
FIG. 1 is a perspective view of a pickup truck showing the tonneau cover attached to the bed of the truck with the hatch panel in the horizontal position.
Figure 3:
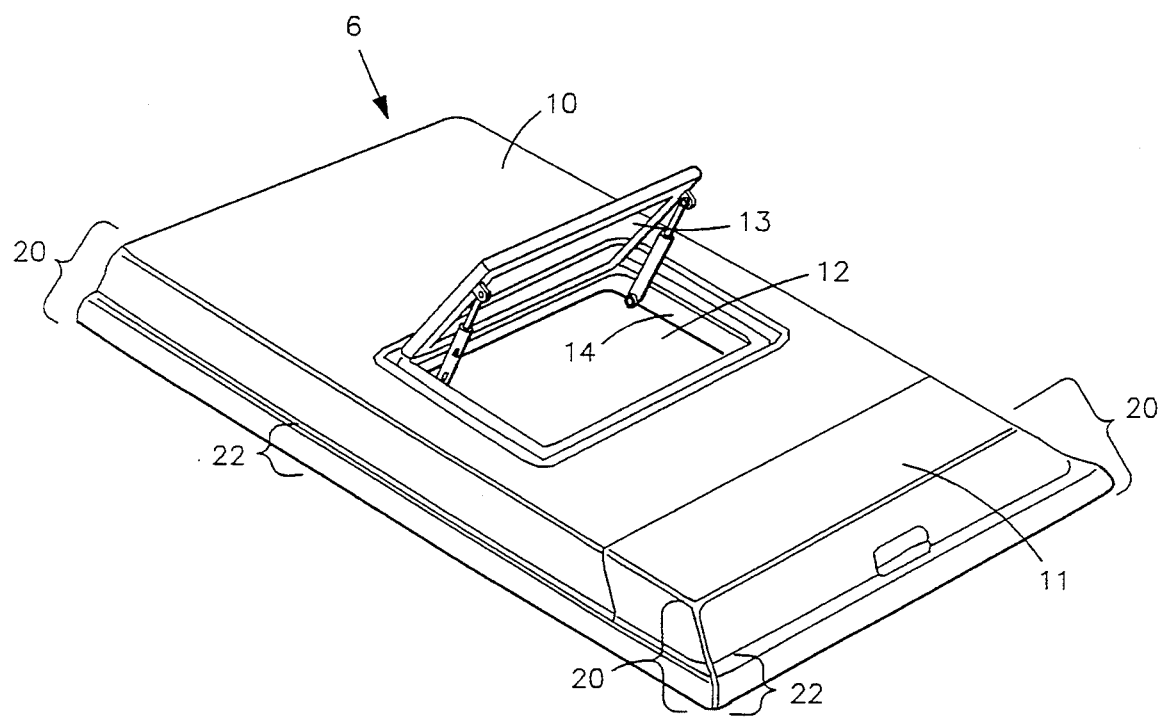
FIG. 3 is a perspective view of the cover with the hatch panel removed and the windshield in the upright position.
Figure 4:
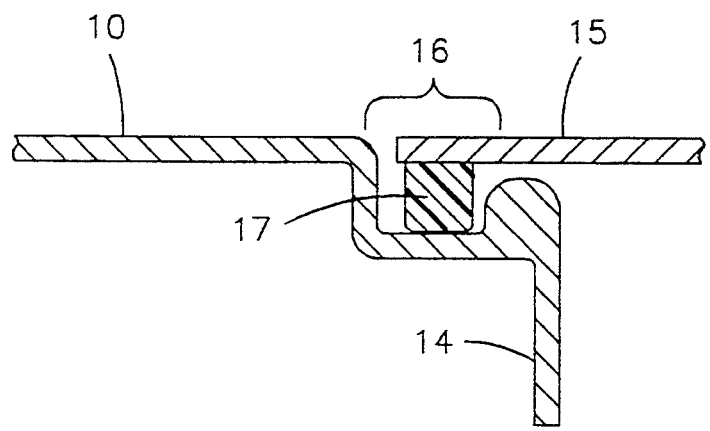
FIG. 4 is an cross-sectional view taken along line 4—4 of FIG. 7 but further including the hatch panel in the horizontal position, thus showing the gaskets of the hatch panel secured in the channel that runs around the edge of the access opening.

As shown in FIG. 3, the present invention is a rigid cover 6, preferably constructed of high quality reinforced plastic or fiberglass, used for enclosing a rectangular truck bed 5 (FIG. 1), that has vertical side walls 3 which provide an upfacing top sidewall edge 4. The cover 6 is comprised of a rectangular, horizontal portion 10 that extends over the length and width of the truck bed 5 and an integral, nearly vertical side wall portion 20 extending downward from the edges of the horizontal top portion 10 around each of its four sides. The side wall portion 20 terminates in a peripheral outwardly flared lip 22. When the cover 6 is placed over the truck bed 5, the side wall portion 20 interfaces with the vertical side walls 3 of the truck bed 5. This allows the outwardly flared lip 22 to make resting contact with the upfacing top sidewall edge 4 and protrude peripherally outwardly and downwardly from the upfacing top sidewall edge 4, thus achieving a water resistant interface and fully enclosing the truck bed 5. Although not shown in the drawings, a series of bosses would normally be made integral with the inside of the side wall portion 20. These bosses would rest upon the upfacing sidewall edge 4 for supporting the weight of the cover 6 and would be secured to the sidewall edge in multiple locations for further securing the cover 6 to the truck.

A separate and removable hatch panel 15 is positioned and supported by resting upon the horizontal portion 10. The hatch panel 15 is adjacent to and level with the horizontal portion 10, covering an access opening 12 in the horizontal portion 10. This roughly rectangular access opening 12 allows entry to the interior of the truck bed 5 and provides an integral, interior, vertically oriented, reinforcement wall 14.

Figure 5:
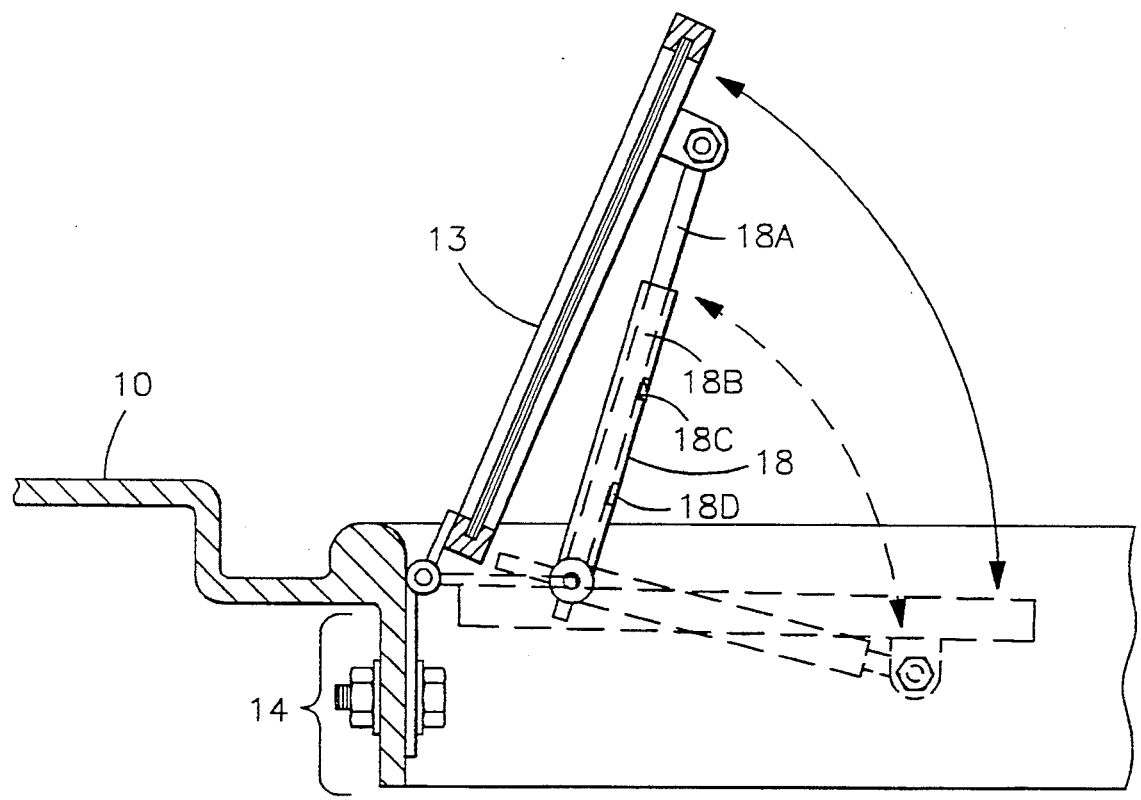
FIG. 5 is cross-sectional view along line 5—5 of FIG. 7 showing the reinforcement wall, the windshield in the upright position and the function of the telescopic brace in adjusting the height of the windshield.
Figure 6:
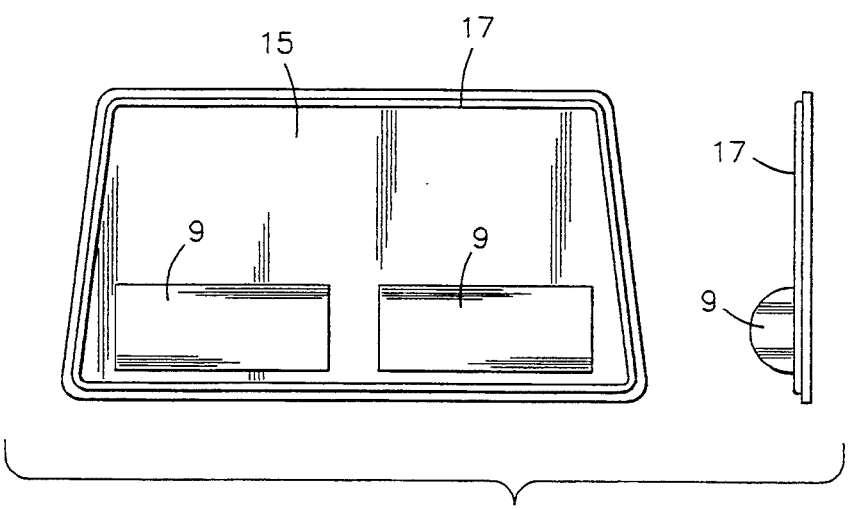
FIG. 6 is an plan view of the hatch panel with head cushions and a side elevational view of the same.

Hingably mounted to the reinforcement wall 14 is a folding windshield 13. When the hatch panel 15 is in place over the access opening 12, the folding windshield 13 lies in horizontal orientation below it. When the hatch panel 15 is removed, the folding windshield 13 can be positioned in an upright, nearly vertical position. The folding windshield 13 is supported by at least one, and preferably two, (one on each side) telescoping braces 18 which have the means for variable and discrete positioning of the windshield 13 when in the upright orientation. Several common means are available to allow the discrete positioning of the windshield, such as is shown in FIG. 5 where the brace 18 consists of a rod or flat bar 18A, pivotally fixed to the upper part of the windshield, and held telescopingly fitted within a tube or a channel 18B which is pivotally fixed at its lower end to the reinforcement wall 14. The rod or flat bar 18A has a tooth 18C, whereas the tube or channel 18B has holes or openings 18D positioned at selected discrete locations therealong. The tooth 18C may be rested and engaged in any one of the holes or openings 18D for positioning the windshield 13 at a selected angle.

The new invention also includes a seat 7 secured to the truck bed 5, preferably by means of bolts or tracks so as to provide for easy removal. The seat 7 is positioned such that at least one adult person of average size is able to normally extend head and shoulders through the access opening 12, above the horizontal portion 10 and behind the windshield 13.

Figure 2:
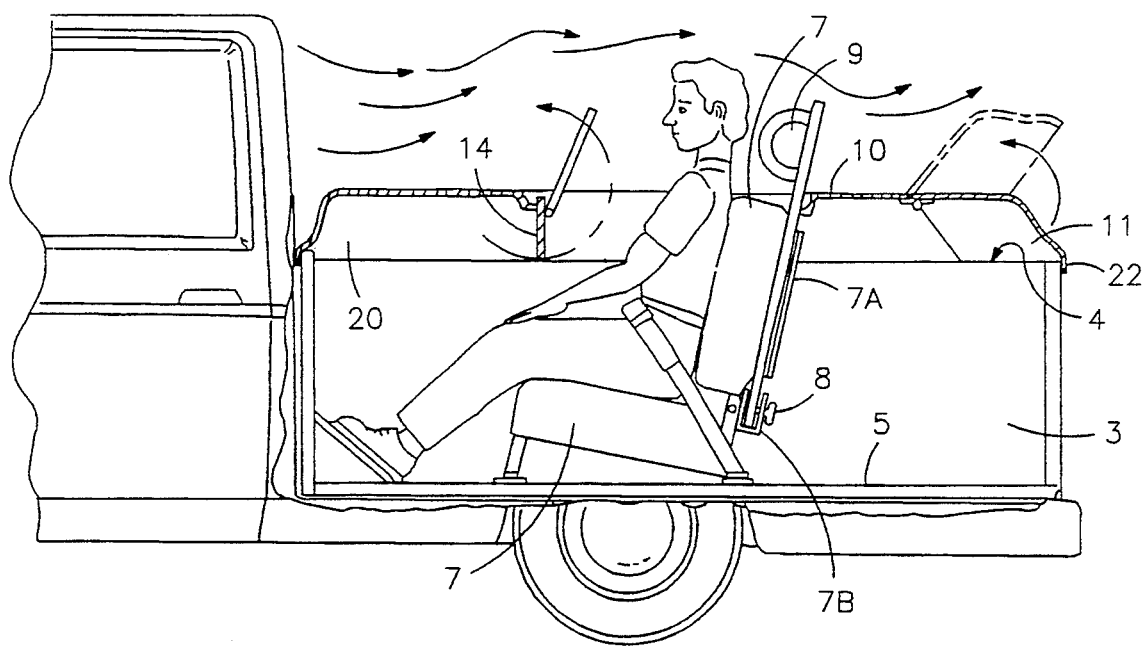
FIG. 2 is a partial breakaway, partial cross-sectional view along line 2—2 of FIG. 1, showing the tonneau cover, hatch and seat assembly in use when seating a passenger.
Figure 7:
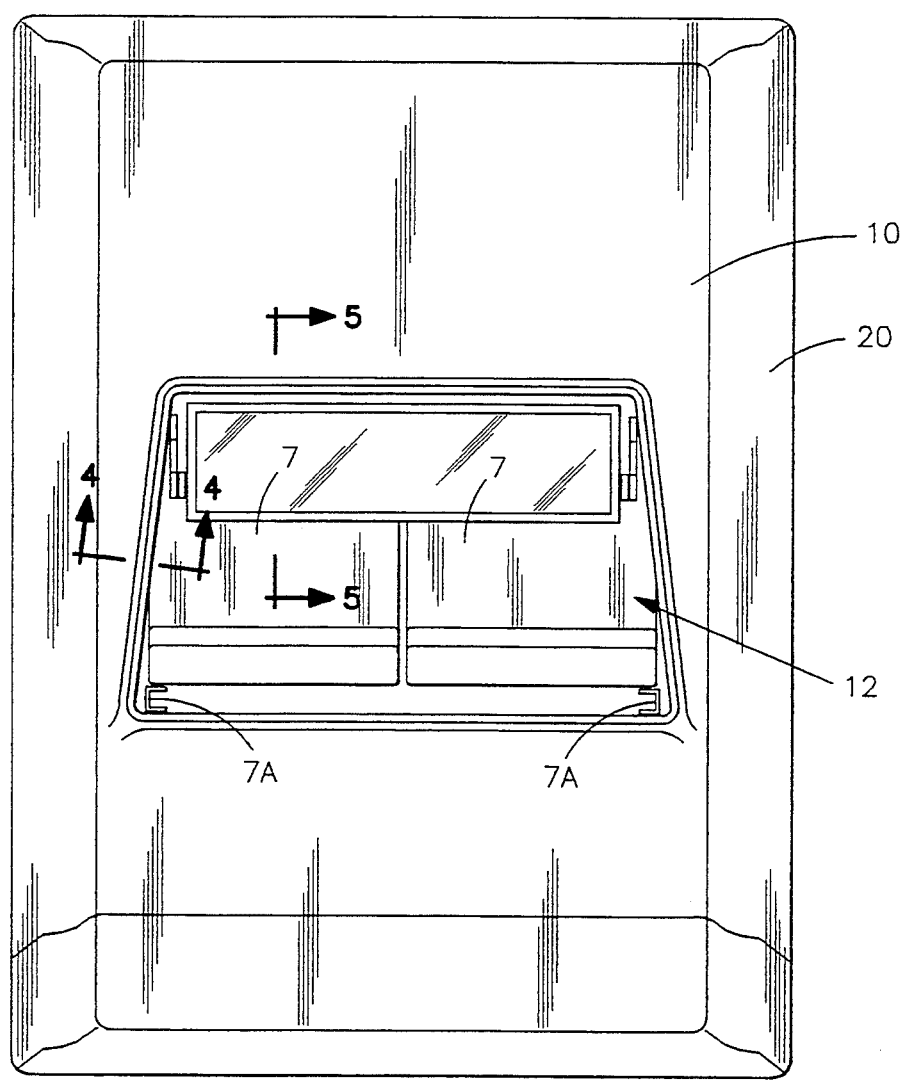
FIG. 7 is a top plan view of the cover, windshield and seats when the hatch panel is removed.

When the hatch panel 15 is removed from its horizontal position adjacent with the horizontal portion 10, it can be placed in an approximately vertical orientation behind the seat 7 and secured in this position by means of a lock handle 8 attached to the rear of the seat 7. The seat includes, in the preferred embodiment, a set of opposing side channels 7A (FIG. 7), and a bottom channel 7B (FIG. 2) for supporting the hatch panel securely in place. Thus the hatch panel 15 is positioned such that it extends upwardly above the horizontal portion 10 and behind the head of the person seated in the seat 7. Preferably, the hatch panel 15 would have head cushions 9 permanently attached to it in such a manner so as to face downwardly into the truck bed 5 when the hatch panel 15 is secured to the horizontal portion 10. The head cushions 9 would then be positioned immediately behind the persons head when the hatch panel 15 is secured in the upright position directly behind seat 7. In this position the hatch panel 15 and the head cushions 9 act to break wind flow behind the person's head and alternately acts as a safety support to the person's head in the event of a collision.

The horizontal portion 10 of the rigid cover 6 is not more than ten inches above the upfacing top sidewall edge 4 of the vertical sidewalls 3 of the truck bed 5. The rigid cover 6 includes a hinge means for enabling a separable rear section 11 of the cover 6 to open upwardly much like an automobile trunk lid, providing rear access to the truck bed 5.

The rigid cover 6 further includes a channel 16 formed integrally in the horizontal portion 10. The channel extends around the access opening 12 and functions to collect and divert water from entering the access opening 12. The hatch panel 15 further includes a peripheral gasket 17 positioned and sized for fitting within the channel 16, thereby sealing the access opening 12. The access opening 12 and the hatch panel 15 are, in the preferred embodiment, shaped as corresponding isosceles trapezoids. The windshield 13 is attached to the smaller base of the trapezoidal shaped access opening 12 and the vertical hatch panel is located at the larger end of the opening. This design accomplishes a number of objectives, such as providing improved shoulder room in the access opening 12 and adequate wind breaking from the windshield 13 while assuring that the hatch panel 15 can only be secured onto the access opening 12 in one orientation.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A rigid cover for enclosing a rectangular truck bed of the type having vertical side walls, the walls providing an upfacing top sidewall edge, the cover comprising:
    a four sided, rectangular, horizontal portion extending over the length and width of the truck bed, and an integral, peripheral, approximately vertical, side wall portion extending downwardly therefrom, on each of the four sides thereof, and terminating in a peripheral outwardly flared lip, such that with the cover placed over the truck bed, the side wall portion interfaces with the vertical side walls of the truck bed, the outwardly flared lip making resting contact with the upfacing top sidewall edge and protruding peripherally outwardly and downwardly therefrom for achieving a water resistant interface therewith and fully enclosing the truck bed;
    a separate and removable hatch panel positioned and supported by the horizontal portion in contiguous planar alignment therewith, the hatch panel covering an access opening in the horizontal portion for providing entry to the interior of the truck bed, the access opening being four sided in shape and providing an integral, interior, vertically oriented, reinforcement wall;
    a folding windshield hingably mounted to the reinforcement wall such that the windshield is positionable in an upright orientation with the hatch panel removed, and in a horizontal orientation with the hatch panel in place on the horizontal portion;
    a seat bolted to the truck bed in a position such that at least one adult person of average size, seated therein, is able to normally extend head and shoulders above the horizontal portion and behind the windshield;

channel means for holding the hatch panel in an approximately vertical orientation to a rear portion of the seat in a position such that the hatch panel extends upwardly above the horizontal portion and behind the head of the person seated in the seat, the hatch panel acting to break wind flow behind the person's head and alternately, to act as a safety support to the person's head in the event of a collision.

2. The rigid cover of claim 1 further including a hinge means for enabling a separable rear section of the cover to open upwardly much like an automobile truck lid, providing rear access to the truck bed.

3. The rigid cover of claim 1 further including a channel formed integrally in the horizontal portion and extending around the access opening for collecting and diverting water from entering the access opening.

4. The rigid cover of claim 3 wherein the hatch panel further includes a peripheral gasket positioned and sized for fitting within the channel to seal the access opening.

5. The rigid cover of claim 4 wherein the hatch panel further includes at least one head cushion such that with the hatch panel positioned behind the seat, the at least one cushion is positioned immediately behind the persons head.

6. The rigid cover of claim 1 wherein the folding windshield is supported by at least one telescoping brace, the at least one brace having means for variable and discrete positioning of the windshield when in the upright orientation.

7. The rigid cover of claim 1 wherein the horizontal portion is not more than 10 inches above the upfacing top sidewall edge of the sidewalls of the truck bed.

8. The rigid cover of claim 1 wherein the access opening and the hatch panel are shaped as corresponding isosceles trapezoids, the windshield being attached to the side corresponding to the upper base of the trapezoidal shape of the access opening, thereby providing improved shoulder room in the access opening and adequate wind breaking from the windshield while assuring that the hatch panel can only be placed over the access opening in one orientation.

* * * * *